US010146595B2

(12) United States Patent
Lai

(10) Patent No.: US 10,146,595 B2
(45) Date of Patent: Dec. 4, 2018

(54) COMPUTER SYSTEM FOR NOTIFYING SIGNAL CHANGE EVENT THROUGH CACHE STASHING

(71) Applicant: MEDIATEK INC., Hsin-Chu (TW)

(72) Inventor: Chi-Chang Lai, Hsinchu County (TW)

(73) Assignee: MEDIATEK INC., Hsin-Chu (TW)

( * ) Notice: Subject to any disclaimer, the term of this patent is extended or adjusted under 35 U.S.C. 154(b) by 137 days.

(21) Appl. No.: 14/720,986

(22) Filed: May 26, 2015

(65) Prior Publication Data

US 2016/0110203 A1 Apr. 21, 2016

Related U.S. Application Data

(60) Provisional application No. 62/065,780, filed on Oct. 20, 2014.

(51) Int. Cl.
*G06F 9/30* (2018.01)
*G06F 9/38* (2018.01)
*G06F 9/54* (2006.01)

(52) U.S. Cl.
CPC ............ *G06F 9/54* (2013.01); *G06F 9/30043* (2013.01); *G06F 9/3851* (2013.01); *G06F 9/3885* (2013.01)

(58) Field of Classification Search
CPC ........ G06F 9/54; G06F 9/544; G06F 9/30047; G06F 9/3004; G06F 9/3885; G06F 9/546; G06F 12/0862; G06F 9/3851; G06F 9/46; G06F 9/52; G06F 9/30043
See application file for complete search history.

(56) References Cited

U.S. PATENT DOCUMENTS

| 6,154,785 | A | 11/2000 | Lakhat | |
|---|---|---|---|---|
| 7,774,522 | B2 | 8/2010 | Bouvier | |
| 8,006,069 | B2 | 8/2011 | Jones | |
| 8,099,557 | B2 * | 1/2012 | McCalpin | G06F 12/0833 711/121 |
| 8,514,232 | B2 * | 8/2013 | Mejdrich | G06F 12/0813 345/505 |
| 2006/0161919 | A1 * | 7/2006 | Onufryk | G06F 9/526 718/102 |
| 2008/0229325 | A1 * | 9/2008 | Supalov | G06F 9/544 719/312 |
| 2011/0246138 | A1 | 10/2011 | Chung | |
| 2011/0289284 | A1 * | 11/2011 | Jung | G06F 9/544 711/154 |

FOREIGN PATENT DOCUMENTS

CN 102971708 A 3/2013
CN 103729166 A 4/2014

* cited by examiner

*Primary Examiner* — Benjamin P Geib
(74) *Attorney, Agent, or Firm* — Winston Hsu

(57) ABSTRACT

A computer system includes a cache unit and a first processing unit. The first processing unit runs a first program thread, and performs an instruction to store information of a signal change event into the cache unit through a cache stashing operation, where the signal change event is initiated by the first program thread for alerting a second program thread.

20 Claims, 6 Drawing Sheets

COMPUTER SYSTEM FOR NOTIFYING SIGNAL CHANGE EVENT THROUGH CACHE STASHING

CROSS REFERENCE TO RELATED APPLICATIONS

This application claims the benefit of U.S. provisional application No. 62/065,780, filed on Oct. 20, 2014 and incorporated herein by reference.

BACKGROUND

The present invention relates to software signaling between program threads (which may run on the same processing unit or run on different processing units), and more particularly, to a computer system for notifying a signal change event through cache stashing.

In a parallel computing system having multiple processing units, multiple program threads often rely on signals to get attention from others to synchronize progress of works. Change of such a signal that is made by a first program thread running on a first processing unit to get attention from a second program thread running on a second processing unit may be associated with a polling operation initiated by the second processing unit or an interrupt operation initiated by the first processing unit. However, the additional latency introduced by the polling operation or the interrupt operation has become more significant when thread-level parallelism gets more fine-grained and more scaled-out.

Hence, there is a need for an innovative signaling design which can reduce the latency of delivering a signal change event from one program thread to another program thread.

SUMMARY

One of the objectives of the claimed invention is to provide a computer system for notifying a signal change event through cache stashing. For example, the proposed cache stashing based signaling scheme may be applied to program threads running on the same processing unit or running on different processing units.

According to a first aspect of the present invention, an exemplary computer system is disclosed. The exemplary computer system includes a cache unit and a first processing unit. The first processing unit is arranged to run a first program thread, and perform an instruction to store information of a signal change event into the cache unit through a cache stashing operation, wherein the signal change event is initiated by the first program thread for alerting a second program thread.

According to a second aspect of the present invention, an exemplary computer system is disclosed. The exemplary computer system includes a cache unit and a first processing unit. The cache unit is arranged to store information of a signal change event in response to a cache stashing operation, wherein the signal change event is initiated by a first program thread. The first processing unit is arranged to run a second program thread, and perform an instruction initiated by the second program thread for acquiring the information of the signal change event.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

The present invention proposes software signaling using hardware cache stashing. Hence, the proposed signaling design delivers a signal change event from one program thread (which may run on one processing unit) to another program thread (which may run on the same processing unit or run on another processing unit) through a cache stashing scheme. Specifically, the proposed signaling design is based on a producer-consumer model with one or more producers to change a signal and one or more consumers being alerted for the signal change. The signal change made by one producer (e.g., one program thread) may need to be transformed into a logical event to alert one or more consumers (e.g., one or more program threads). A consumer may wait on certain signal change condition(s) of one or more signals changed by one or more producers. The cache stashing scheme is used to coordinate the signal change event delivery initiated by a producer and the signal change event acquisition initiated by a consumer. With the help of the cache stashing scheme, the consumer may initiate the signal change event acquisition before or after the signal change event delivery initiated by the producer. In this way, the processor execution flow of the consumer may not be halted or trapped when the signal change event acquisition is not initiated by the consumer at the time the producer initiates the signal change event delivery, thereby solving the latency issue encountered by the conventional signaling design using a polling operation or an interrupt operation. Further details of the proposed signaling design are described as below.

Figure 1:
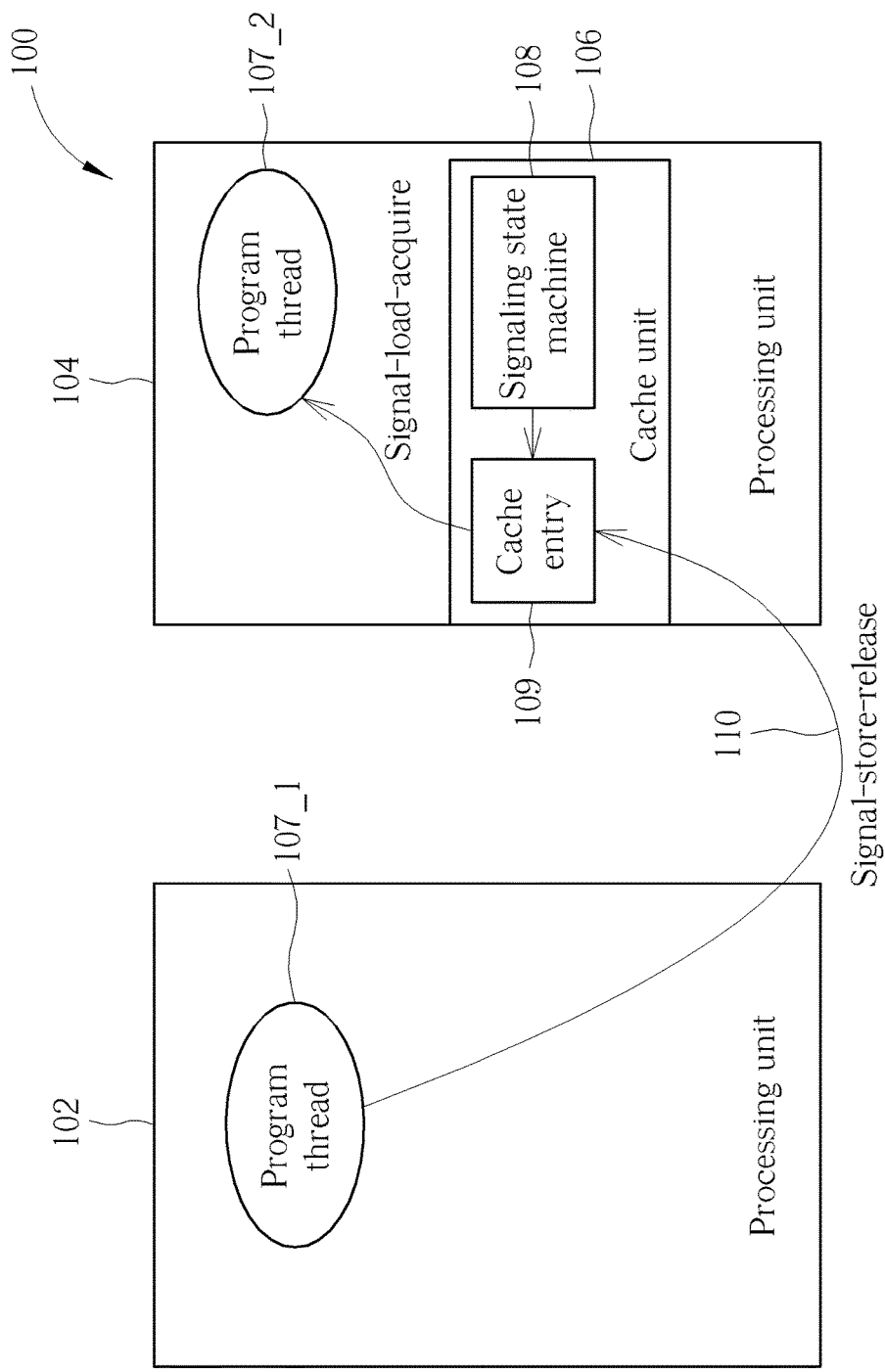
FIG. 1 is a diagram illustrating a computer system according to a first embodiment of the present invention.

FIG. 1 is a diagram illustrating a computer system according to a first embodiment of the present invention. The computer system 100 is a parallel computing system, and therefore includes a plurality of processing units (e.g., processor cores). For clarity and simplicity, the computer system 100 is shown having two processing units 102 and 104 communicating with each other through an external bus 110, where the processing unit 104 has a cache unit 106 implemented therein. As shown in FIG. 1, one program thread 107_1 is running on the processing unit 102, and another program thread 107_2 is running on the processing unit 104. However, this is for illustrative purposes only, and is not meant to be a limitation of the present invention. Alternatively, the program threads 107_1 and 107_1 may run on the same processing unit 104. In this embodiment, the processing unit 102 performs a signal-store-release instruction to deliver a signal change event initiated by the program thread 107_1 for alerting the program thread 107_2 running on the processing unit 104. Hence, the processing unit 102 acts as a "producer" processing unit, and the processing unit 104 acts as a "consumer" processing unit. In one exemplary implementation, the signal-store-release instruction is a store-release instruction applied to an address region that is dedicated to signaling operation. In another exemplary implementation, the signal-store-release instruction is a store-release type of instruction dedicated to signaling operation. It should be noted that, a store-release instruction would ensure that all previous instructions are completed at its completion.

With regard to the processing unit 104 acting as the "consumer" processing unit, it performs a wait-on-signal instruction (e.g., a signal-load-acquire instruction) initiated by the program thread 107_2 for acquiring information of the signal change event. In one exemplary implementation, the signal-load-acquire instruction is a load-acquire instruction applied to an address region that is dedicated to signaling operation. In another exemplary implementation, the signal-load-acquire instruction is a load-acquire type of instruction dedicated to signaling operation. It should be noted that the signal-load-acquire instruction is not completed unless the desired signal change event is observed. Further, the load-acquire instruction would ensure that all following instructions will be completed only after its completion.

In a first case where the program thread 107_2 initiates the signal-load-acquire instruction at the time the program thread 107_1 initiates the signal-store-release instruction, the incoming signal change event is timely observed by instant execution of the signal-load-acquire instruction. Hence, the signal change event and its associated changed value are immediately received by the program thread 107_2 without being stashed into the cache unit 106. That is, when the program thread 107_2 initiates the signal-load-acquire instruction while there is an incoming signal change event, the signal-store-release instruction initiated by the program thread 107_1 is transformed into a cache stashing operation by hardware (e.g., cache unit 106) but not recorded in the signaling state machine 108 associated with the cache unit 106 to affect any cache state of the cache unit 106.

In a second case where the program thread 107_2 initiates the signal-load-acquire instruction after the program thread 107_1 initiates the signal-store-release instruction, the signal-store-release instruction initiated by the program thread 107_1 is transformed into a cache stashing operation by hardware (e.g., processing unit 104). In other words, when the incoming signal change event is not immediately received by the processing unit 104 (particularly, program thread 107_2), the cache unit 106 (particularly, signaling state machine 108 associated with the cache unit 106) stores information of the signal change event received by the processing unit 104, which is a cache stashing operation initiated by the signal-store-release instruction on the processing unit 102, where the signal change event is initiated by the program thread 107_1 for alerting the program thread 107_2 running on the processing unit 104. In this embodiment, the cache unit 106 has the signaling state machine 108 arranged to assign a predetermined state "Change-Locked" to a cache entry 109 in response to cache stashing of the information of the signal change event, where the predetermined state "Change-Locked" is arranged to indicate that the information of the signal change event has been recorded in the associated cache entry 109. When the program thread 107_2 initiates the signal-load-acquire instruction after the information of the signal change event is stashed into the cache unit 106, the signal change event is observed due to matching of the "Change-Locked" cache entry 109 in the cache unit 106, and the signal-load-acquire instruction loads the information of the signal change event from the cache unit 106 to complete its execution at this moment. Further, "matching" of a recorded cache state means the recorded cache state is associated with a signal operation operating on a signal variable that is the same as a signal variable on which the signal-load-acquire instruction operates.

In a third case where the program thread 107_2 initiates the signal-load-acquire instruction before the program thread 107_1 initiates the signal-store-release instruction, the processor execution flow of the processing unit 104 is halted to wait for the signal change event initiated by the program thread 107_1 running on the processing unit 102. Hence, when the program thread 107_1 initiates the signal-store-release instruction to deliver the signal change event, the incoming signal change event is observed and the signal-load-acquire instruction receives the signal change event to complete its execution.

In this embodiment, the signal-load-acquire instruction is used to match with a signal change event for continuation of signal change sensing. In contrast to a conventional load-acquire instruction which loads stored data from a designated address directly/unconditionally, the signal-load-acquire instruction loads stored data to complete its execution only when it matches a "Change-Locked" cache entry or an incoming signal change event. Alternatively, the signal-load-acquire instruction may be provided with a conditional code with an expected value to match with a prospective changed value of a signal. That is, the signal-load-acquire instruction may complete its execution only when a signal change event is observed having a changed value matching the expected value.

Figure 2:
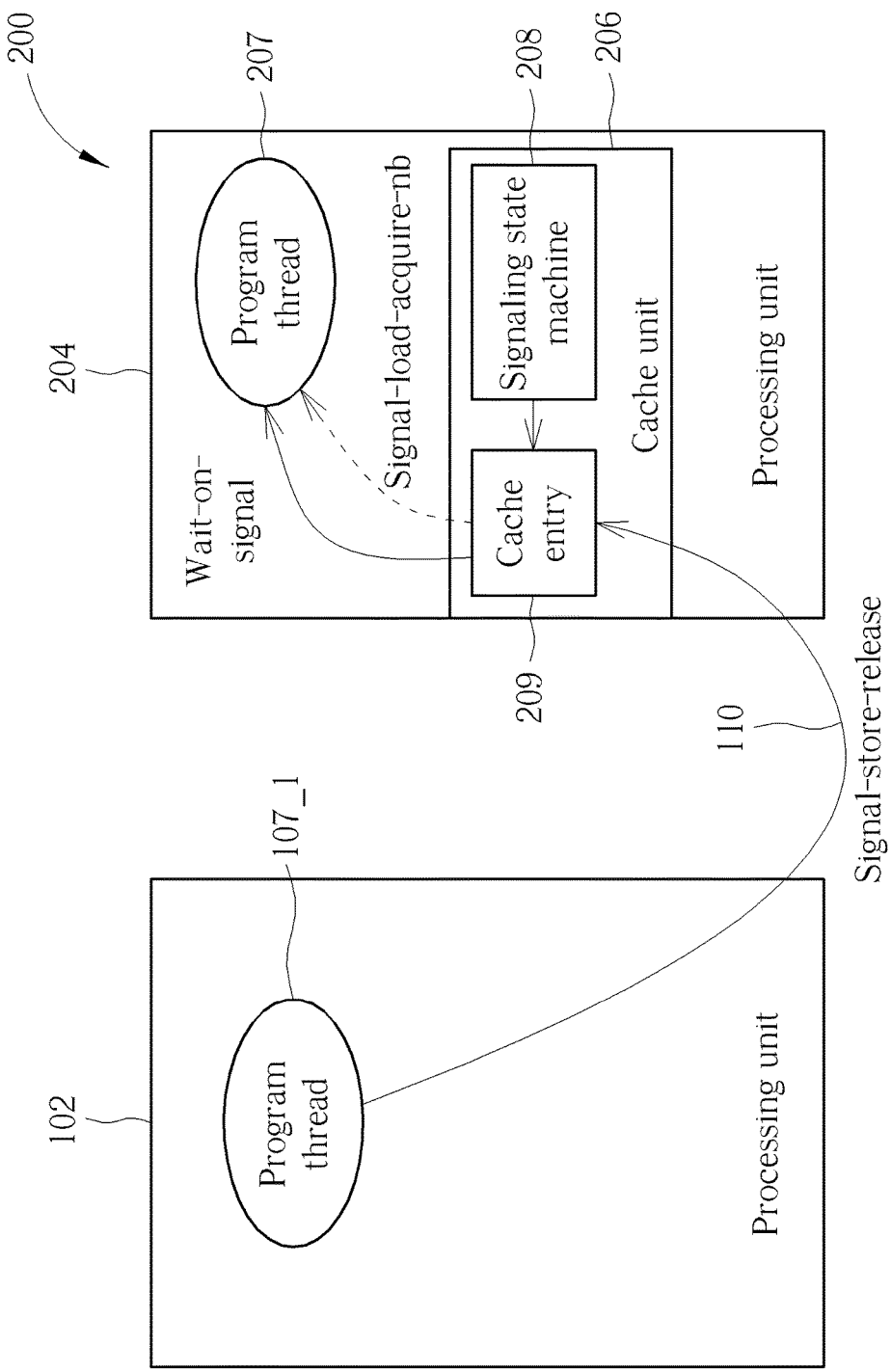
FIG. 2 is a diagram illustrating a computer system according to a second embodiment of the present invention.

FIG. 2 is a diagram illustrating a computer system according to a second embodiment of the present invention. The computer system 200 is a parallel computing system, and includes a plurality of processing units (e.g., processor cores). For clarity and simplicity, the computer system 200 is shown having a processing unit 204 and the aforementioned processing unit 102 communicating with each other through the external bus 110, where the processing unit 204 has a cache unit 206 implemented therein, and a program thread 207 is running on the processing unit 204. However, this is for illustrative purposes only, and is not meant to be a limitation of the present invention. Alternatively, the program threads 107_1 and 207 may run on the same processing unit 204. The processing unit 204 performs await-on-signal instruction, such as a non-blocking signal-load-acquire instruction (called signal-load-acquire-nb instruction hereinafter), initiated by the program thread 207 for acquiring information of the signal change event. The processing unit 102 acts as a "producer" processing unit, and the processing unit 204 acts as a "consumer" processing unit. In one exemplary implementation, the signal-load-acquire-nb instruction is a load-acquire instruction applied to an address region that is dedicated to signaling operation.

In another exemplary implementation, the signal-load-acquire-nb instruction is a load-acquire type of instruction dedicated to signaling operation. It should be noted that, from the perspective of the processing unit design, the signal-load-acquire-nb instruction may be completed in its first execution when there is no expected signal change event, and may be completed in a later execution when the expected signal change event is observed. In other words, the proposed non-blocking signal-load-acquire instruction is always completed when executed, regardless of the signal change situation.

In a first case where the program thread 207 initiates the signal-load-acquire-nb instruction at the time the program thread 107_1 initiates the signal-store-release instruction, the incoming signal change event is timely observed by instant execution of the signal-load-acquire-nb instruction. Hence, the signal change event and its associated changed value are immediately received by the program thread 207 without being stashed into the cache unit 206. That is, when the program thread 207 initiates the signal-load-acquire-nb instruction while there is an incoming signal change event, the signal-store-release instruction initiated by the program thread 207 is transformed into a cache stashing operation by hardware (e.g., cache unit 206) but not recorded in the signaling state machine 208 associated with the cache unit 206 to affect any cache state of the cache unit 206.

In a second case where the program thread 207 initiates the signal-load-acquire-nb instruction after the program thread 107_1 initiates the signal-store-release instruction, the signal-store-release instruction initiated by the program thread 107_1 is transformed into a cache stashing operation by hardware (e.g., cache unit 206), and then recorded in the signaling state machine 208 associated with the cache unit 206. In other words, when the incoming signal change event is not immediately received by the processing unit 204 (particularly, program thread 207), the cache unit 206 (particularly, signaling state machine 208 associated with the cache unit 206) stores information of the signal change event received by the processing unit 204, which is a cache stashing operation initiated by the signal-store-release instruction on the processing unit 102, where the signal change event is initiated by the program thread 107_1 for alerting the program thread 207 running on the processing unit 204. In this embodiment, the cache unit 206 has the signaling state machine 208 arranged to assign a predetermined state "Change-Locked" to a cache entry 209 in response to cache stashing of the information of the signal change event, where the predetermined state "Change-Locked" is arranged to indicate that the information of the signal change event has been recorded in the associated cache entry 209. When the program thread 207 initiates the signal-load-acquire-nb instruction after the information of the signal change event is stashed into the cache unit 206, the signal change event is observed due to matching of the "Change-Locked" cache entry 209, and the signal-load-acquire-nb instruction loads the information of the signal change event from the cache unit 206 to complete its execution. For example, "matching" of a recorded cache state means the recorded cache state is associated with a signal operation operating on a signal variable that is the same as a signal variable on which the signal-load-acquire-nb instruction operates.

In a third case where the program thread 207 initiates the signal-load-acquire-nb instruction before the program thread 107_1 initiates the signal-store-release instruction, the processor execution flow of the processing unit 204 is not halted to wait for the signal change event initiated by the program thread 107_1 running on the processing unit 102. Instead, the program thread 207 completes the signal-load-acquire-nb instruction at its first execution due to absence of an expected signal change (i.e., a signal value currently loaded by the signal-load-acquire-nb instruction is invalid/meaningless for subsequent instructions), and executes a load-acquire instruction (e.g., one of the proposed signal-load-acquire instruction, signal-load-acquire-nb instruction, signal-load-acquire-nbcb instruction, and signal-load-acquire-int instruction) at a later time to check if the signal change event can be observed. Since the load-acquire instruction (e.g., signal-load-acquire-nb instruction) may be selected and used by the processor execution flow to check availability of the signal change event at a later time if needed, the processor execution flow of the program thread 207 is not halted when the signal change event is not observed by the signal-load-acquire-nb instruction at its first execution. Hence, after the program thread 107_1 initiates the signal-store-release instruction to deliver the signal change event, the incoming signal change event or the signal change event stashed into the cache unit 206 is observed at the time the signal-load-acquire-nb instruction is executed by the processing unit 204. It should be noted that the signal-load-acquire-nb instruction will be completed each time it is executed, regardless of the sensing result of the signal change. In other words, a sensing result of signal change obtained by one signal-load-acquire-nb instruction may be valid or invalid, depending on whether the expected signal change event occurs.

In the third case where the program thread 207 initiates the signal-load-acquire-nb instruction before the program thread 107_1 initiates the signal-store-release instruction, the signaling state machine 208 may be further arranged to assign a predetermined state "Wait-Locked" to the cache entry 209 in response to miss of the signal change event, where the predetermined state "Wait-Locked" is arranged to indicate that the program thread 207 has initiated a wait-on-signal instruction (e.g., signal-load-acquire-nb instruction) to wait for the signal change event. If the signal-load-acquire-nb instruction initiated by the program thread 207 is not completed yet but the program thread 207 becomes inactive due to being preempted by another program thread of a higher priority, an error handling scheme may be enabled. For example, the signal-load-acquire-nb instruction may be converted into another signal-load-acquire instruction, such as a signal-load-acquire-int instruction that will be discussed later. When the desired signal change event initiated by the program thread 107_1 matches the "Wait-Locked" cache entry 209, the program thread 207 can load information of the desired signal change event through the signal-load-acquire-int instruction.

In this embodiment, the signal-load-acquire-nb instruction is used to match with a signal change event for continuation of signal change sensing. In contrast to a conventional load-acquire instruction which loads stored data from a designated address directly/unconditionally, the signal-load-acquire-nb instruction may load stored data to complete its execution when it matches a "Change-Locked" cache entry or an incoming signal change event. Alternatively, the signal-load-acquire-nb instruction may be provided with a conditional code with an expected value to match with a prospective changed value of a signal. That is, the signal change sensing process is successful when a signal change event is observed having a changed value matching the expected value.

Figure 3:
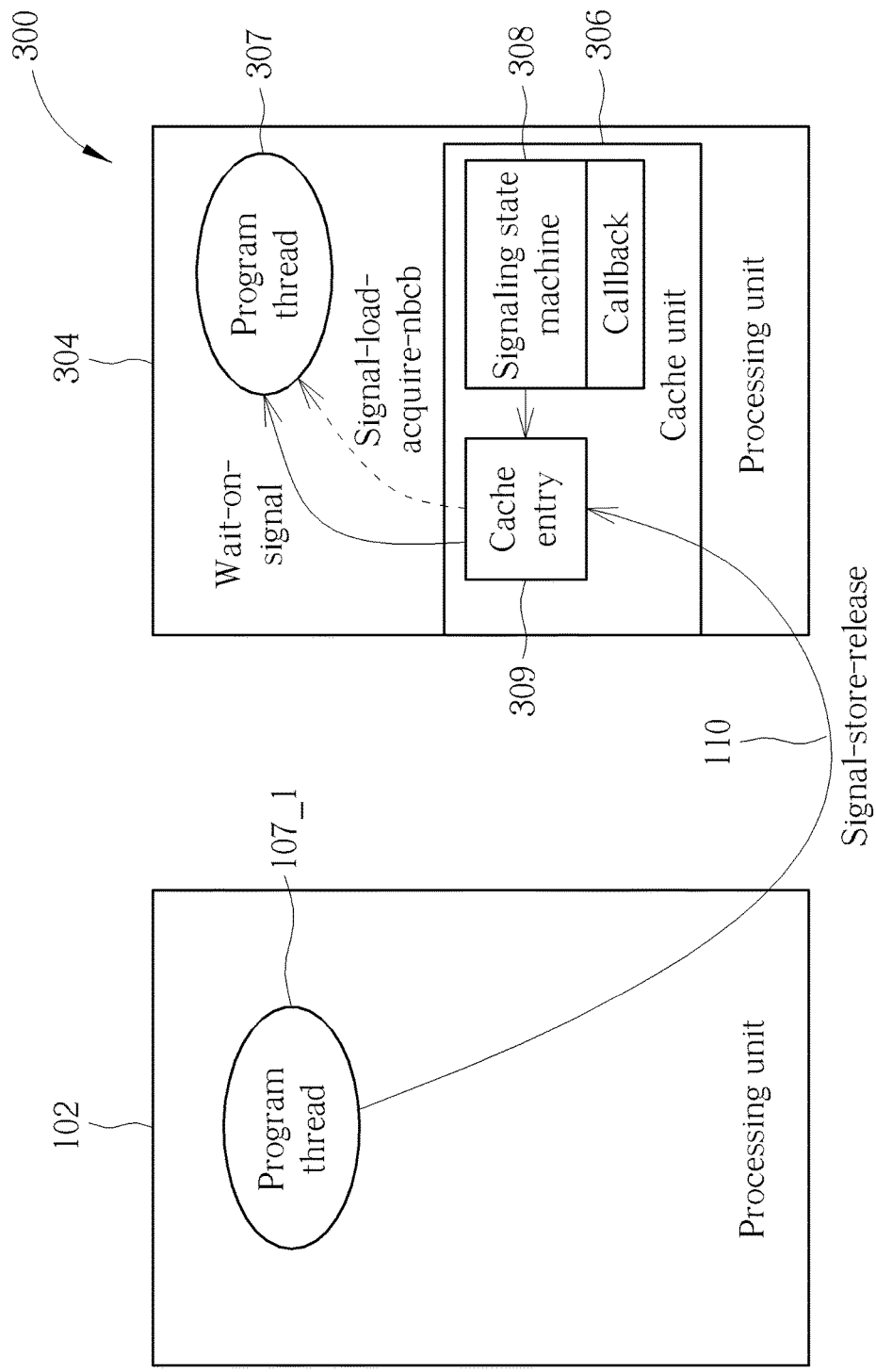
FIG. 3 is a diagram illustrating a computer system according to a third embodiment of the present invention.

FIG. 3 is a diagram illustrating a computer system according to a third embodiment of the present invention. The computer system 300 is a parallel computing system, and includes a plurality of processing units (e.g., processor cores). For clarity and simplicity, the computer system 300 is shown having a processing unit 304 and the aforementioned processing unit 102 communicating with each other through the external bus 110, where the processing unit 304 has a cache unit 306 implemented therein, and a program thread 307 is running on the processing unit 304. However, this is for illustrative purposes only, and is not meant to be a limitation of the present invention. Alternatively, the program threads 107_1 and 307 may run on the same processing unit 304. The processing unit 304 performs await-on-signal instruction, such as a non-blocking signal-load-acquire instruction with callback (called signal-load-acquire-nbcb instruction hereinafter), initiated by the program thread 307 for acquiring information of the signal change event. The processing unit 102 acts as a "producer" processing unit, and the processing unit 304 acts as a "consumer" processing unit. In one exemplary implementation, the signal-load-acquire-nbcb instruction is a load-acquire instruction applied to an address region that is dedicated to signaling operation. In another exemplary implementation, the signal-load-acquire-nbcb instruction is a load-acquire type of instruction dedicated to signaling operation. It should be noted that, from the perspective of the processing unit design, the signal-load-acquire-nbcb instruction may be completed in its first execution when there is no expected signal change event, and may be completed in a later execution when the expected signal change event is observed. In other words, the proposed non-blocking signal-load-acquire instruction with callback is always completed when executed, regardless of the signal change situation.

In a first case where the program thread 307 initiates the signal-load-acquire-nbcb instruction at the time the program thread 107_1 initiates the signal-store-release instruction, the incoming signal change event is timely observed by instant execution of the signal-load-acquire-nbcb instruction. Hence, the signal change event and its associated changed value are immediately received by the program thread 307 without being stashed into the cache unit 306. That is, when the program thread 307 initiates the signal-load-acquire-nbcb instruction while there is an incoming signal change event, the signal-store-release instruction initiated by the program thread 107_1 is transformed into a cache stashing operation by hardware (e.g., cache unit 306) but not recorded in the signaling state machine 308 associated with the cache unit 306 to affect any cache state of the cache unit 306.

In a second case where the program thread 307 initiates the signal-load-acquire-nbcb instruction after the program thread 107_1 initiates the signal-store-release instruction, the signal-store-release instruction initiated by the program thread 107_1 is transformed into a cache stashing operation by hardware (e.g., cache unit 306), and then recorded in the signaling state machine 308 associated with the cache unit 306. In other words, when the incoming signal change event is not immediately received by the processing unit 304 (particularly, program thread 307), the cache unit 306 (particularly, signaling state machine 308 associated with the cache unit 306) stores information of the signal change event received by the processing unit 304, which is a cache stashing operation initiated by the signal-store-release instruction on the processing unit 102, where the signal change event is initiated by the program thread 107_1 for alerting the program thread 307 running on the processing unit 304. In this embodiment, the cache unit 306 has the signaling state machine 308 arranged to assign a predetermined state "Change-Locked" to a cache entry 309 in response to cache stashing of the information of the signal change event, where the predetermined state "Change-Locked" is arranged to indicate that the information of the signal change event has been recorded in the associated cache entry 309. When the program thread 307 initiates the signal-load-acquire-nbcb instruction after the information of the signal change event is stashed into the cache unit 306, the signal change event is observed due to matching of the "Change-Locked" cache entry 309, and the signal-load-acquire-nbcb instruction loads the information of the signal change event from the cache unit 306 to complete its execution. For example, "matching" of a recorded cache state means the recorded cache state is associated with a signal operation operating on a signal variable that is the same as a signal variable on which the signal-load-acquire-nbcb instruction operates.

In a third case where the program thread 307 initiates the signal-load-acquire-nbcb instruction before the program thread 107_1 initiates the signal-store-release instruction, the processor execution flow of the processing unit 304 is not halted to wait for the signal change event initiated by the program thread 107_1 running on the processing unit 102. In addition, the signaling state machine 308 is arranged to assign a predetermined state "Wait-Locked" to the cache entry 309 and to record a callback operand associated with the "Wait-Locked" cache entry 309 in response to miss of the signal change event, where the predetermined state "Wait-Locked" is arranged to indicate that the program thread 307 has initiated a wait-on-signal instruction (e.g., signal-load-acquire-nbcb instruction) to wait for the signal change event. When the signal change event is initiated by the program thread 107_1 running on the processing unit 102, the signal change event matches the "Wait-Locked" cache entry 309, and a callback function is invoked based on the recorded callback operand to redirect the processor execution flow back to the program thread 307 for continuation of signal change sensing. As mentioned above, the signal-load-acquire-nbcb instruction is always completed when executed, regardless of the signal change situation. Hence, in a case where the load-acquire instruction executed due to the invoked callback function is the same signal-load-acquire-nbcb instruction, the load-acquire instruction should be considered as anew instruction that is executed after the previously-executed signal-load-acquire-nbcb instruction has been completed. In this embodiment, the callback operand may indicate a subroutine address in the program thread 307 that issues the signal-load-acquire-nbcb instruction before. In addition, information of the incoming signal change event is stashed into the cache unit 306, and any kind of load-acquire instruction (e.g., one of the proposed signal-load-acquire instruction, signal-load-acquire-nb instruction, signal-load-acquire-nbcb instruction, and signal-load-acquire-int instruction) may be executed in response to the callback function that is invoked due to matching of the "Wait-Locked" cache entry 309.

If the signal-load-acquire-nbcb instruction initiated by the program thread 307 is completed with recording of a callback operand but the program thread 307 becomes inactive due to context switching, an error handling scheme may be enabled. However, this is for illustrative purposes only, and is not meant to be a limitation of the present invention.

In this embodiment, the signal-load-acquire-nbcb instruction is used to match with a signal change event for continuation of signal change sensing. In contrast to a conventional load-acquire instruction which loads stored data from a designated address directly/unconditionally, the signal-load-acquire-nbcb instruction may load stored data to complete its execution without recording a callback operand when it matches a "Change-Locked" cache entry during execution, or when it matches a "NORMAL" cache entry corresponding to an incoming signal change event during execution. Alternatively, the signal-load-acquire-nbcb instruction may be provided with a conditional code with an expected value to match with a prospective changed value of a signal. That is, the signal change sensing process is successful when a signal change event is observed having a changed value matching the expected value.

Figure 4:
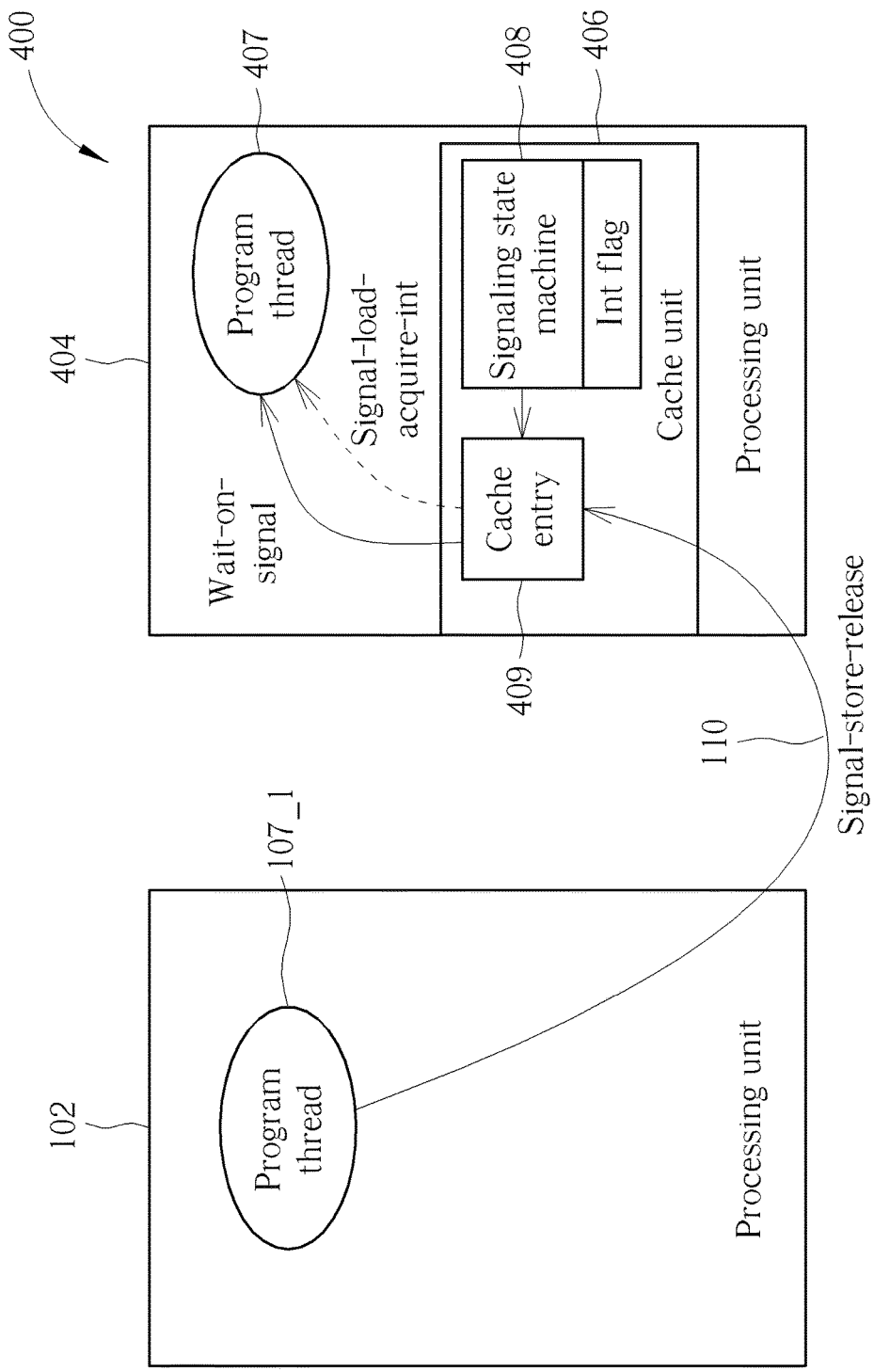
FIG. 4 is a diagram illustrating a computer system according to a fourth embodiment of the present invention.

FIG. 4 is a diagram illustrating a computer system according to a fourth embodiment of the present invention. The computer system 400 is a parallel computing system, and includes a plurality of processing units (e.g., processor cores). For clarity and simplicity, the computer system 400 is shown having a processing unit 404 and the aforementioned processing unit 102 communicating with each other through the external bus 110, where the processing unit 404 has a cache unit 406 implemented therein, and a program thread 407 is running on the processing unit 404. However, this is for illustrative purposes only, and is not meant to be a limitation of the present invention. Alternatively, the program threads 107_1 and 407 may run on the same processing unit 404. The processing unit 404 performs await-on-signal instruction, such as a non-blocking signal-load-acquire instruction with interrupt enablement (called signal-load-acquire-int instruction hereinafter), initiated by the program thread 407 for acquiring information of the signal change event. The processing unit 102 acts as a "producer" processing unit, and the processing unit 404 acts as a "consumer" processing unit. In one exemplary implementation, the signal-load-acquire-int instruction is a load-acquire instruction applied to an address region that is dedicated to signaling operation. In another exemplary implementation, the signal-load-acquire-int instruction is a load-acquire type of instruction dedicated to signaling operation. It should be noted that, from the perspective of the processing unit design, the signal-load-acquire-int instruction may be completed in its first execution when there is no expected signal change event, and may be completed in a later execution when the expected signal change event is observed. In other words, the non-blocking signal-load-acquire instruction with interrupt enablement (e.g., interrupt flag) is always completed when executed, regardless of the signal change situation.

In a first case where the program thread 407 initiates the signal-load-acquire-int instruction at the time the program thread 107_1 initiates the signal-store-release instruction, the incoming signal change event is timely observed by instant execution of the signal-load-acquire-int instruction. Hence, the signal change event and its associated changed value are immediately received by the program thread 407 without being stashed into the cache unit 406. That is, when the program thread 407 initiates the signal-load-acquire-int instruction while there is an incoming signal change event, the signal-store-release instruction initiated by the program thread 107_1 is transformed into a cache stashing operation by hardware (e.g., cache unit 406) but not recorded in the signaling state machine 408 associated with the cache unit 406 to affect any cache state of the cache unit 406.

In a second case where the program thread 407 initiates the signal-load-acquire-int instruction after the program thread 107_1 initiates the signal-store-release instruction, the signal-store-release instruction initiated by the program thread 107_1 is transformed into a cache stashing operation by hardware (e.g., cache unit 406), and then recorded in the signaling state machine 408 associated with the cache unit 406. In other words, when the signal change event is not immediately received by the processing unit 404 (particularly, program thread 407), the cache unit 406 (particularly, signaling state machine 408 associated with the cache unit 406) stores information of the signal change event received by the processing unit 404, which is a cache stashing operation initiated by the signal-store-release instruction on the processing unit 102, where the signal change event is initiated by the program thread 107_1 for alerting the program thread 407 running on the processing unit 404. In this embodiment, the cache unit 406 has a signaling state machine 408 arranged to assign a predetermined state "Change-Locked" to a cache entry 409 in response to cache stashing of the information of the signal change event, where the predetermined state "Change-Locked" is arranged to indicate that the information of the signal change event has been recorded in the associated cache entry 409. When the program thread 407 initiates the signal-load-acquire-int instruction after the information of the signal change event is stashed into the cache unit 406, the signal change event is observed due to matching of the "Change-Locked" cache entry 409, and the signal-load-acquire-int instruction loads the information of the signal change event from the cache unit 406 to complete its execution. For example, "matching" of a recorded cache state means the recorded cache state is associated with a signal operation operating on a signal variable that is the same as a signal variable on which the signal-load-acquire-int instruction operates.

In a third case where the program thread 407 initiates the signal-load-acquire-int instruction before the program thread 107_1 initiates the signal-store-release instruction, the processor execution flow of the processing unit 404 is not halted to wait for the signal change event initiated by the program thread 107_1 running on the processing unit 102. In addition, the signaling state machine 408 is arranged to assign a predetermined state "Wait-Locked" to the cache entry 409 and to associate the "Wait-Locked" cache entry 409 with an interrupt enablement logic in response to miss of the signal change event, where the predetermined state "Wait-Locked" is arranged to indicate that the program thread 407 has initiated a wait-on-signal instruction (e.g., signal-load-acquire-int instruction) to wait for the signal change event. When the signal change event is initiated by the program thread 107_1 running on the processing unit 102, the signal change event matches the "Wait-Locked" cache entry 309, and an interrupt event is triggered based on the interrupt enablement logic to eventually trap the processing unit 404 to serve the interrupt event for continuation of signal change sensing. As mentioned above, the signal-load-acquire-int instruction is always completed when executed, regardless of the signal change situation. Hence, in a case where a load-acquire instruction executed due to the triggered interrupt enablement logic is the same signal-load-acquire-int instruction, the load-acquire instruction should be considered as a new instruction that is executed after the previously-executed signal-load-acquire-int instruction has been completed. In this embodiment, information of the incoming signal change event is stashed into the cache unit 406, and any kind of load-acquire instruction (e.g., one of the proposed signal-load-acquire instruction, signal-load-acquire-nb instruction, signal-load-acquire-nbcb instruction, and signal-load-acquire-int instruction) may be executed in response to the interrupt enablement logic that is triggered due to matching of the "Wait-Locked" cache entry 409.

In this embodiment, the signal-load-acquire-int instruction is used to match with a signal change event for continuation of signal change sensing. In contrast to a conventional load-acquire instruction which loads stored data from a designated address directly/unconditionally, the signal-load-acquire-int instruction may load stored data to complete its execution without recording an interrupt flag when it matches a "Change-Locked" cache entry during execution, or when it matches a "NORMAL" cache entry corresponding to an incoming signal change event during execution. Alternatively, the signal-load-acquire-int instruction may be provided with a conditional code with an expected value to match with a prospective changed value of a signal. That is, the signal change sensing process is successful when a signal change event is observed having a changed value matching the expected value.

In each of the exemplary embodiments shown in FIGS. 1-4, a cache unit 106/206/306/406 is implemented in a "consumer" processing unit 104/204/304/404 coupled to a "producer" processing unit 102 through the external bus 110. However, this is for illustrative purposes only, and is not meant to be a limitation of the present invention. The location of the cache unit may be adjusted, depending upon actual design consideration. Several alternative designs are disclosed as below.

Figure 5:
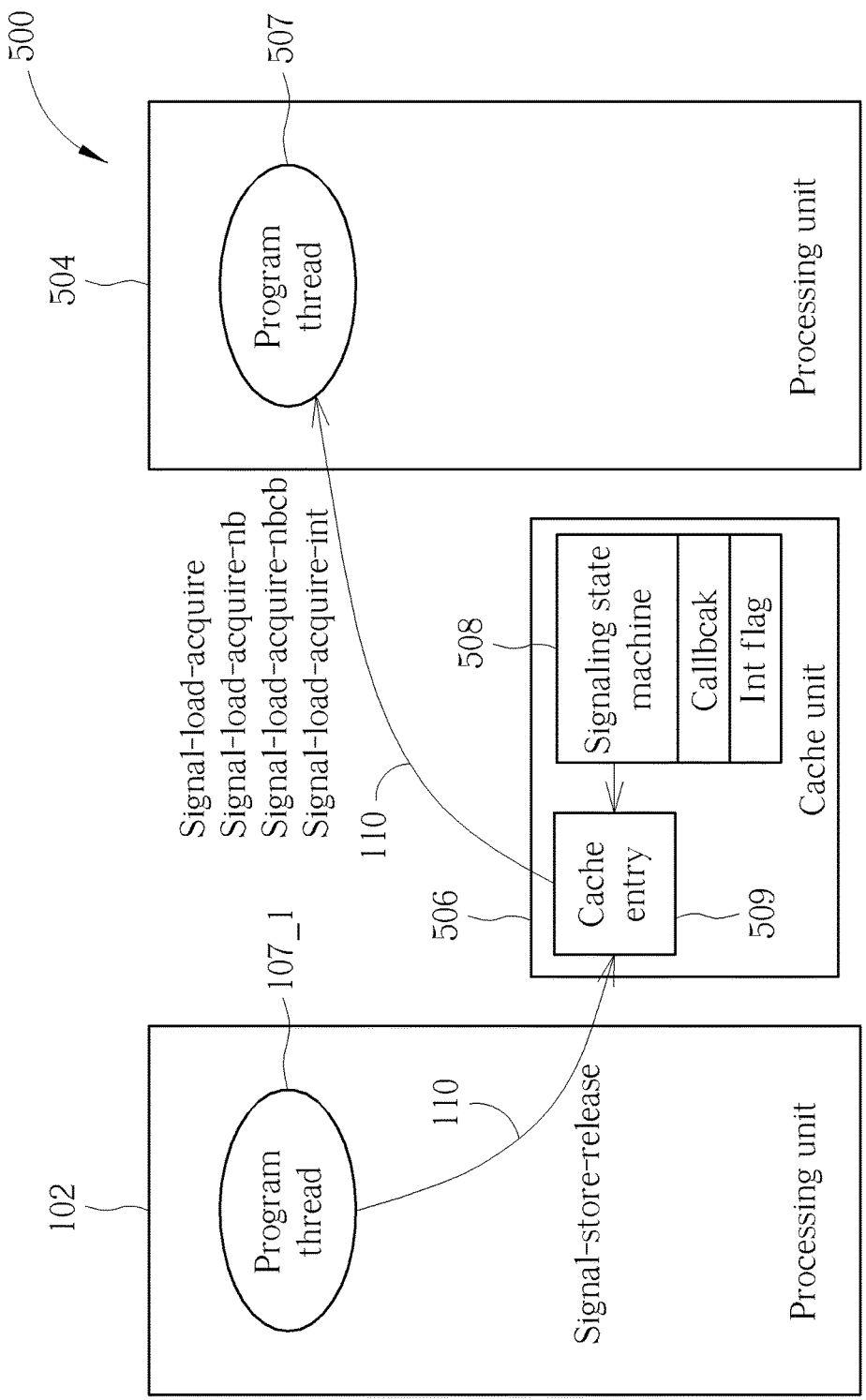
FIG. 5 is a diagram illustrating a computer system according to a fifth embodiment of the present invention.

FIG. 5 is a diagram illustrating a computer system according to a fifth embodiment of the present invention. The computer system 500 is a parallel computing system, and includes a plurality of processing units (e.g., processor cores). For clarity and simplicity, the computer system 500 is shown having a processing unit 504 and the aforementioned processing unit 102 communicating with each other through the external bus 110, where a program thread 507 is running on the processing unit 504. The processing unit 102 may perform the signal-store-release instruction initiated by the program thread 107_1 for alerting the program thread 507 running on the processing unit 504. The processing unit 504 performs a wait-on-signal instruction (e.g., one of signal-load-acquire instruction, signal-load-acquire-nb instruction, signal-load-acquire-nbcb instruction and signal-load-acquire-int instruction) initiated by the program thread 507 for acquiring information of a signal change event. Hence, the processing unit 102 serves as a "producer" processing unit, and the processing unit 504 serves as a "consumer" processing unit. In this embodiment, a cache unit 506 is external to both of the processing units 102 and 504, where the cache unit 506 has a cache entry 509, and further has a signaling state machine 508 used to assign a predetermined state (e.g., "NORMAL", "Change-Locked" or"Wait-Locked") to the cache entry 509. Moreover, the signal-store-release instruction and the wait-on-signal instruction (e.g., one of signal-load-acquire instruction, signal-load-acquire-nb instruction, signal-load-acquire-nbcb instruction and signal-load-acquire-int instruction) are carried via bus transaction on the external bus 110. When the proposed signal-store-release bus transaction is received by the cache unit 506, the cache unit 506 is instructed to match with a wait-on-signal currently or previously issued to the cache unit 506 or record the signal-store-release bus transaction together with its associated address and data values to match with a wait-on-signal later issued to the cache unit 506. Unlike a conventional load-acquire bus transaction, the proposed wait-on-signal bus transaction (particularly, the entire process to sense the expected signal change event) will not be successful until it matches a signal-store-release bus transaction to the cache unit 506. A specific wait-on-signal bus transaction (e.g., signal-load-acquire-nbcb bus transaction or signal-load-acquire-int bus transaction) may request the cache unit 506 to record the transaction together with its associated address and data values for later matching, and then the specific wait-on-signal bus transaction may be completed for allowing the processing unit 504 to continue its processor execution flow. When a later match occurs, a callback parameter or an interrupt parameter stored into the cache unit 506 due to the earlier-issued specific wait-on-signal bus transaction (e.g., signal-load-acquire-nbcb bus transaction or signal-load-acquire-int bus transaction) is carried by the bus transaction to notify the processing unit 504.

Since a person skilled in the art should readily understand details of the computer system 500 after reading above paragraphs directed to the computer systems 100-400, further description is omitted here for brevity.

Figure 6:
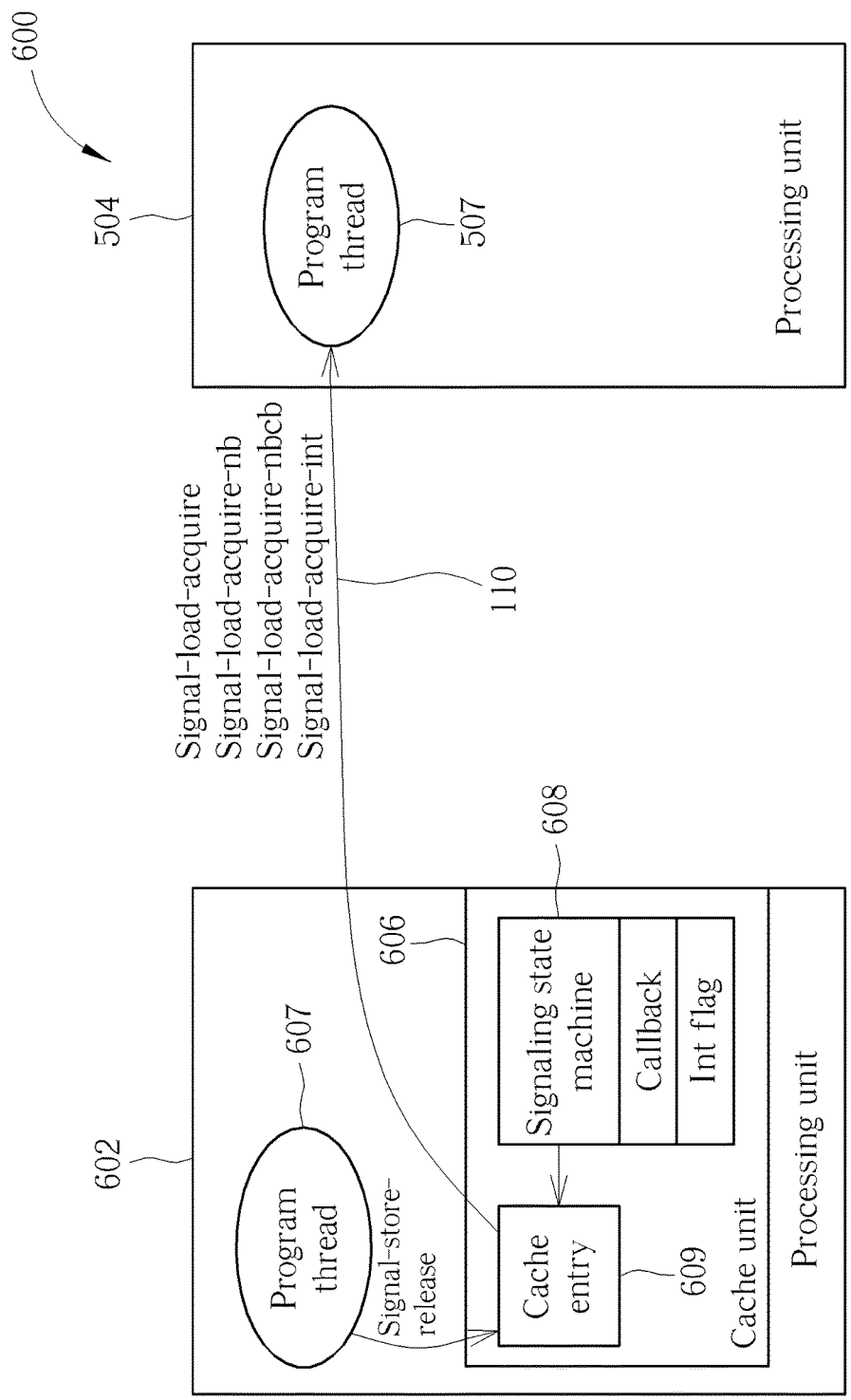
FIG. 6 is a diagram illustrating a computer system according to a sixth embodiment of the present invention.

FIG. 6 is a diagram illustrating a computer system according to a sixth embodiment of the present invention. The computer system 600 is a parallel computing system, and includes a plurality of processing units (e.g., processor cores). For clarity and simplicity, the computer system 600 includes a processing unit 602 and the aforementioned processing unit 502 communicating with each other through the external bus 110, where a program thread 607 is running on the processing unit 602. The processing unit 602 may perform the signal-store-release instruction initiated by the program thread 607 for alerting the program thread 507 running on the processing unit 504. The processing unit 504 performs a wait-on-signal instruction (e.g., one of signal-load-acquire instruction, signal-load-acquire-nb instruction, signal-load-acquire-nbcb instruction and signal-load-acquire-int instruction) initiated by the program thread 507 for acquiring information of a signal change event. Hence, the processing unit 602 serves as a "producer" processing unit, and the processing unit 504 serves as a "consumer" processing unit. In this embodiment, a cache unit 606 is implemented in the processing unit 602, where the cache unit 606 has a cache entry 609, and further has a signaling machine 608 used to assign a predetermined state (e.g., "NORMAL", "Change-Locked" or "Wait-Locked") to the cache entry 609. Moreover, the signal-store-release instruction is transmitted inside the processing unit 602, while the wait-on-signal instruction (e.g., one of signal-load-acquire instruction, signal-load-acquire-nb instruction, signal-load-acquire-nbcb instruction and signal-load-acquire-int instruction) is transmitted via bus transaction on the external bus 110. Since a person skilled in the art should readily understand details of the computer system 600 after reading above paragraphs directed to the computer systems 100-500, further description is omitted here for brevity.

The signaling state machine (e.g., 108, 208, 308, 408, 508 or 608) is implemented to accommodate synchronization between signal producer(s) (e.g., 102 or 602) and signal consumer(s) (e.g., 104, 204, 304, 404, or 504). By way of example, but not limitation, the signaling state machine may have several states, including a "NORMAL" state, a "Change-Locked" state, a "Wait-Locked" state, and an "ERROR" state. A cache entry assigned with the "NORMAL" state is not used for signal synchronization between signal producer(s) and signal consumer(s). A cache entry assigned with the "Change-Locked" state has recorded information of a signal change event due to absence of a corresponding wait-on-signal instruction (e.g., signal-load-acquire instruction, signal-load-acquire-nb instruction, sig-nal-load-acquire-nbcb instruction, or signal-load-acquire-int instruction). A cache entry assigned with the "Wait-Locked" state indicates that a wait-on-signal instruction (e.g., signalload-acquire instruction, signal-load-acquire-nb instruction, signal-load-acquire-nbcb instruction, or signal-load-acquire-int instruction) has been waiting for a corresponding signal change event that does not happen yet. A cache entry assigned with the "ERROR" state indicates that an error occurs during the hardware cache stashing based software signaling operation. For example, the "ERROR" state is flagged in response to a signal-load-acquire-nbcb instruction that is executed when the corresponding signaling state is "Wait-Locked" with a set interrupt flag. For another example, the "ERROR" state is flagged in response to a signal-load-acquire-int instruction that is executed when the corresponding signaling state is "Wait-Locked" with a valid callback operand. An error handling scheme may be enabled to complete the signal change sensing process. The above is for illustrative purposes only, and is not meant to be a limitation of the present invention. In practice, the signaling state machine may be modified to support other states.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A computer system comprising:
   a cache unit; and
   a first processing unit, arranged to run a first program thread, and perform an instruction to store information of a signal change event into the cache unit through a cache stashing operation, wherein the signal change event is initiated by the first program thread for alerting a second program thread;
   wherein when the first program thread initiates the signal change event before the second program thread performs an instruction to acquire the information of the signal change event, the information of the signal change event is stored into the cache unit through the cache stashing operation, where the information of the signal change event is not acquired by the second program thread before the information of the signal change event is stored into the cache unit by the cache stashing operation;
   wherein when the first program thread initiates the signal change event at the time the second program thread initiates the instruction to acquire the information of the signal change event, the information of the signal change event is not stored into the cache unit through the cache stashing operation; and
   wherein when the second program thread performs the instruction to acquire the information of the signal change event before the first program thread initiates the signal change event, the information of the signal change event is acquired by the second program thread at the time the first program thread initiates the signal change event, or is acquired by the second program thread after the information of the signal change event is stored into the cache unit by the cache stashing operation.

2. The computer system of claim 1, wherein the cache unit is implemented in a processing unit on which the second program thread is running.

3. The computer system of claim 1, wherein the second program thread is running on a second processing unit of the computer system, and the cache unit is external to the first processing unit and the second processing unit.

4. The computer system of claim 1, wherein the cache unit is implemented in the first processing unit.

5. The computer system of claim 1, wherein the instruction is a store-release instruction applied to an address region that is dedicated to signaling operation.

6. The computer system of claim 1, wherein the instruction is a store-release type of instruction dedicated to signaling operation.

7. The computer system of claim 1, wherein the cache unit comprises a signaling state machine arranged to assign a predetermined state to a cache entry in response to cache stashing of the information of the signal change event, where the predetermined state is arranged to indicate that the information of the signal change event has been recorded in the cache entry.

8. A computer system comprising:
   a cache unit, arranged to store information of a signal change event in response to a cache stashing operation, wherein the signal change event is initiated by a first program thread; and
   a first processing unit, arranged to run a second program thread, and perform an instruction initiated by the second program thread for acquiring the information of the signal change event from the cache unit;
   wherein when the first program thread initiates the signal change event before the second program thread performs the instruction to acquire the information of the signal change event, the information of the signal change event is stored into the cache unit through the cache stashing operation, where the information of the signal change event is not acquired by the second program thread before the information of the signal change event is stored into the cache unit by the cache stashing operation;
   wherein when the first program thread initiates the signal change event at the time the second program thread initiates the instruction to acquire the information of the signal change event, the information of the signal change event is not stored into the cache unit through the cache stashing operation; and
   wherein when the second program thread performs the instruction to acquire the information of the signal change event before the first program thread initiates the signal change event, the information of the signal change event is acquired by the second program thread at the time the first program thread initiates the signal change event, or is acquired by the second program thread after the information of the signal change event is stored into the cache unit by the cache stashing operation.

9. The computer system of claim 8, wherein the cache unit is implemented in the first processing unit.

10. The computer system of claim 8, wherein the first program thread is running on a second processing unit of the computer system, and the cache unit is external to the first processing unit and the second processing unit.

11. The computer system of claim 8, wherein the cache unit is implemented in a processing unit on which the first program thread is running.

12. The computer system of claim 8, wherein the instruction is a load-acquire instruction applied to an address region that is dedicated to signaling operation.

13. The computer system of claim 8, wherein the instruction is a load-acquire type of instruction dedicated to signaling operation.

14. The computer system of claim 8, wherein the instruction is a signal-load-acquire instruction that is not completed unless the signal change event is observed.

15. The computer system of claim 8, wherein when the signal change event is not observed at the time the first processing unit performs the instruction, the instruction does not halt a processor execution flow of the first processing unit.

16. The computer system of claim 15, wherein the cache unit comprises a signaling state machine arranged to assign a predetermined state to a cache entry of the cache unit in response to miss of the signal change event, where the predetermined state is arranged to indicate that the second program thread has initiated the instruction to wait for the signal change event.

17. A computer system comprising:
   a cache unit, arranged to store information of a signal change event in response to a cache stashing operation, wherein the signal change event is initiated by a first program thread; and
   a first processing unit, arranged to run a second program thread, and perform an instruction initiated by the second program thread for acquiring the information of the signal change event from the cache unit;
   wherein when the signal change event matches a cache entry assigned with a predetermined state, a callback function is invoked to redirect the processor execution flow of the first processing unit back to the second program thread for continuation of signal change sensing.

18. The computer system of claim 17, wherein the signal change event is initiated by the first program thread after the first processing unit performs the instruction; and the cache unit comprises a signaling state machine arranged to assign the predetermined state to the cache entry of the cache unit and record a callback operand associated with the cache entry in response to miss of the signal change event, where the predetermined state is arranged to indicate that the second program thread has initiated the instruction to wait for the signal change event.

19. A computer system comprising:
   a cache unit, arranged to store information of a signal change event in response to a cache stashing operation, wherein the signal change event is initiated by a first program thread; and
   a first processing unit, arranged to run a second program thread, and perform an instruction initiated by the second program thread for acquiring the information of the signal change event from the cache unit;
   wherein when the signal change event matches a cache entry assigned with a predetermined state, an interrupt event is triggered to trap the first processing unit to serve the interrupt event for continuation of signal change sensing.

20. The computer system of claim 19, wherein the signal change event is initiated by the first program thread after the first processing unit performs the instruction; and the cache unit comprises a signaling state machine arranged to assign the predetermined state to the cache entry of the cache unit and to associate the cache entry with an interrupt enablement logic in response to miss of the signal change event, where the predetermined state is arranged to indicate that the second program thread has initiated the instruction to wait for the signal change event.

* * * * *